Oct. 1, 1968   R. R. WINGERT   3,404,054
METHOD FOR THE MANUFACTURE OF SANDWICH PANELS
Filed April 6, 1965   2 Sheets-Sheet 1
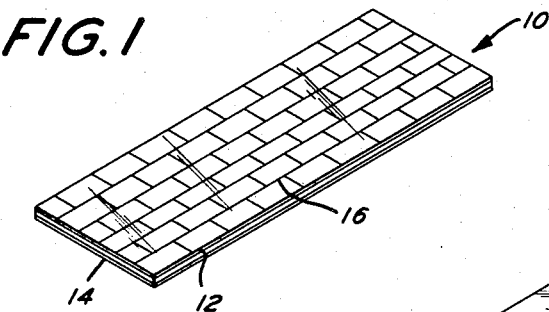
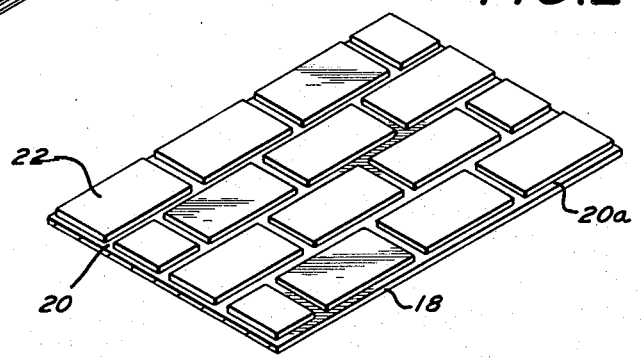
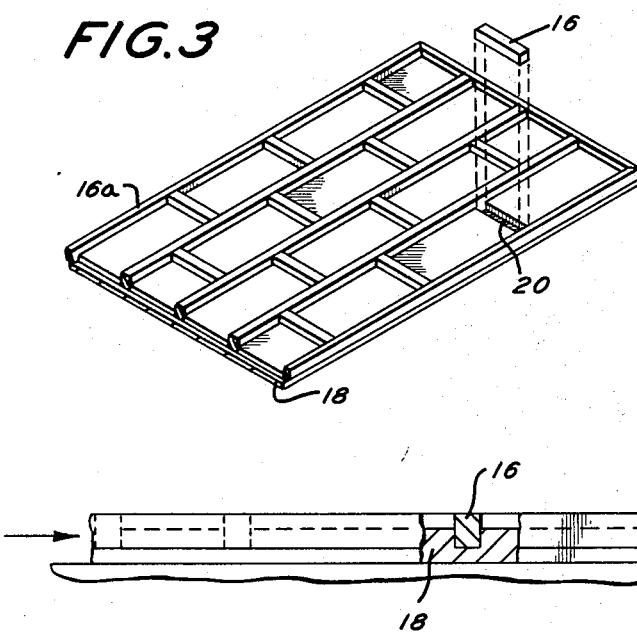
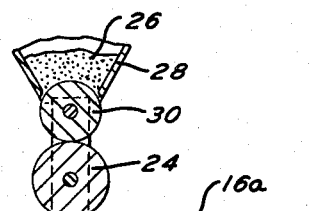
INVENTOR.
ROBERT R. WINGERT
BY *Seidel & Gonda*
ATTORNEYS.

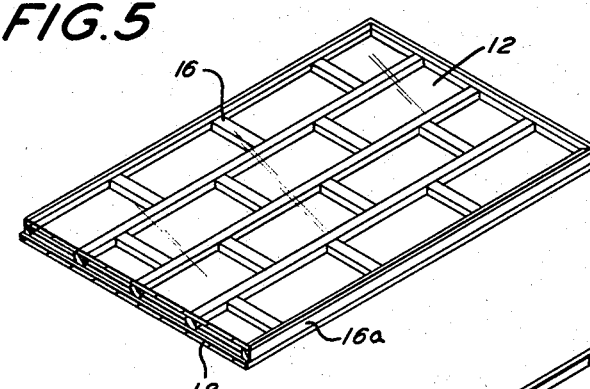
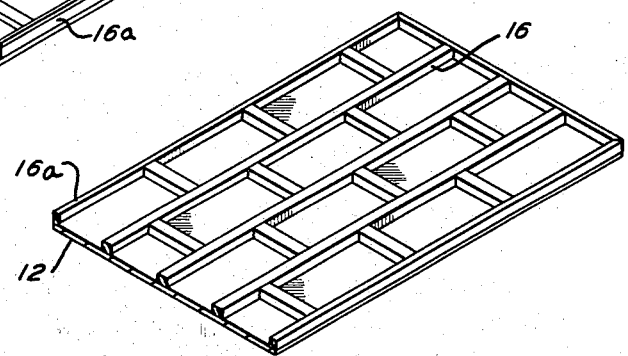
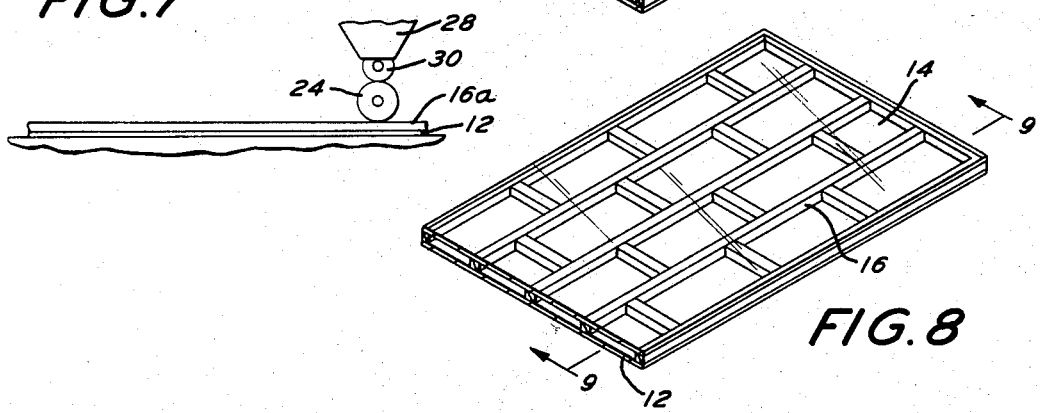
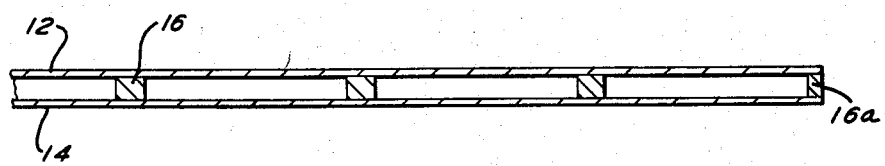

United States Patent Office 3,404,054
Patented Oct. 1, 1968

3,404,054
METHOD FOR THE MANUFACTURE OF SANDWICH PANELS
Robert R. Wingert, 108 De Fillipo Drive,
South Plainfield, N.J. 07080
Filed Apr. 6, 1965, Ser. No. 446,004
7 Claims. (Cl. 156—292)

ABSTRACT OF THE DISCLOSURE

A method of making sandwich panels is disclosed using a jig having a plurality of recesses therein arranged in a grid pattern. Core pieces are partially disposed within the jig recesses. A first lamina is joined to the exposed surfaces on the core pieces. Then the lamina and core pieces are separated from the jig so that a second lamina may be secured to the core pieces parallel to the first lamina.

---

This invention relates to a method for the manufacture of sandwich panels. More particularly, this invention relates to a method for the manufacture of hollow core sandwich panels having core pieces as the supporting structure thereof.

Hollow core structures such as sandwich panels comprising two outer sheets of material fixed to an inner core of supporting struts are known. Such panels have heretofore been manufactured by the process of interlocking or spot-welding the core pieces to form the honeycomb or grid pattern supporting structure. Thus, it has been the practice to first construct the gridlike inner-supporting structure so that it is a self-supporting unit and then bond or otherwise fix the outer panel sheets to it. This method of construction is time-consuming and expensive since it either incorporates specially constructed core pieces that interlock or are joined by spot welds, mortise joints, etc.

The present invention overcomes the disadvantages of the prior art by providing a readily-constructed jig that will support the core pieces without any direct mechanical connection between them until one of the panel sheets is fixed thereto. Subsequently, the second panel sheet is fixed in opposing relation to the first panel sheet and the hollow core structure thereby completed. As thus constructed, the sandwich panel is just as suitable for the purposes to which it is to be put as the prior art panels having interlocked or joined core pieces. Moreover, the panels constructed in accordance with the present invention require less time, expense, and manpower to construct. Further, the types of special core pieces required can be reduced to a minimum.

It therefore is a general object of the present invention to provide a novel method for manufacturing sandwich panels.

It is another object of the present invention to provide a novel method of manufacturing hollow core structures.

It is still another object of the present invention to provide a novel method of manufacturing hollow core structures without mechanical joints between the core pieces.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a perspective view of a hollow core panel completed in accordance with the principles of this invention.

FIGURE 2 is a perspective view of one form of the jig used in performing the method of this invention.

FIGURE 3 is a perspective view of the jig supporting the core pieces as one of the steps performed in the present invention.

FIGURE 4 is a side elevational view illustrating the application of a bonding compound to the core pieces supported within the jig.

FIGURE 5 is a perspective view illustrating the fixing of a panel sheet to the core pieces.

FIGURE 6 is a perspective view of the core pieces and panel sheet as removed from the jig.

FIGURE 7 is a side elevational view illustrating the application of a bonding compound to the structure illustrated in FIGURE 6.

FIGURE 8 is a perspective view showing the fixing of a second panel to the core pieces.

FIGURE 9 is a longitudinal sectional view of the panel shown in FIGURE 8 taken along the line 9—9.

Referring now to the drawings in detail, wherein like numerals indicate like elements, there is shown in FIGURE 1 a hollow core structure or sandwich panel designated generally as 10. The sandwich panel 10 includes first and second outer panel sheets 12 and 14 fixed to an inner grid of core pieces 16. Although the panel 10 is shown as having transparent sheets 12 and 14 mounted to horizontally and longitudinally arranged grid pieces 16, it is to be understood that this is only exemplary of one type of panel that can be constructed using the method and apparatus of this invention. Thus, the panel sheets could be translucent or transparent materials for showing the grid design such as plastic or fiberglass and the core could be aluminum, steel, wood or any other material that can be cut, bent and shaped if desired. Moreover, if the panel is not to be used for the design qualities of the grid structure, then the sheet panels 12 and 14 can be made of non-transparent materials including plastics and wood.

Referring now to FIGURE 2, there is shown a jig 18 for constructing the panel illustrated in FIGURE 1. As shown, the jig 18 is a generally planar member of uniform thickness. Although the jig 18 is shown as being rectangular in form, it will be readily recognized that this plays no part in the method because it is the shape of the grid that determines the outline of the panel. However, the rectangular form is preferred for purposes of manipulating the jig 18.

The jig 18 has a plurality of recesses 20 cut in the surface 22 thereof. As shown, the recesses 18 are cut to form a pattern that is the same as the grid pattern of the core pieces 16 in panel 10. For reasons to be explained below, the recesses 20 are cut to a depth that is less than the thickness of the core pieces 16. The width of recesses 20 should be substantially the same as that of core pieces 16 so that they may be received therein. The perimeter of the grid formed by core pieces 16, which also is the perimeter of the panel 10 in the preferred embodiment, is defined by the recesses 20a and extend around the edge of grid 16.

By way of example, the jig 18 may be made in the following manner, although it is to be recognized that there are other processes for making it. First, the desired grid design is selected and laid out on the surface 22. Next, the recesses 20 are cut using a machine tool such as a router, bench saw, radial saw, milling machine, chisel or the like. As indicated above, the depth and width of recesses 20 is determined in accordance with the size of core pieces to be supported therein. The jig 18 is preferably made out of chipboard, Masonite, wood or other materials in which the recesses can be machined. The jig 18 could also be vacuum-formed punched out of metal, plastic, Plexiglas or other related materials.

After the jig 18 has been constructed, the core pieces 16 which have been precut to the proper size and shape are inserted into the recesses 20 as shown in FIGURE 3. It should be noted that the peripheral core pieces 16a are mitered and placed into the jig to define the periphery of panel 10. It should also be noted that the core pieces 16 are supported in position solely by the recesses 20. Thus, there is no mechanical connection between any of the core pieces 16 as they are merely set within the recesses 20 which support them.

After all of the core pieces have been set in their proper position, the jig 18 is passed beneath an application roller 24 which applies a bonding agent 26 that is transferred from hopper 28 to application roller 24 by transfer roller 30. The application roller 24 applies bonding agent 26 only to the top surface of core pieces 16.

The next step in the manufacturing process is to fix a first sheet panel 12 to the coated surfaces of core pieces 16. The bonding material is a non-hardening glue which is allowed to cure after the sheet panel 12 has been applied and then the sheet panel 12 together with the core pieces 16 are removed from the jig and set with panel face downward. This is best shown in FIGURE 6.

After the glue has sufficiently cured, the sheet panel 12 and core pieces 16 are passed beneath the application roller 24 and the bonding agent 26 is applied to the opposite surface of core pieces 16. The second sheet panel 14 is next applied to the coated surfaces of core pieces 16 so as to become fixed thereto when the bonding agent cures. At this point the panel 10 has now been completed.

As indicated above, the grid pattern of core pieces 16 is only illustrative of any number of patterns that may be used. In addition to the rectangular pattern shown, triangular, circular and other geometric patterns could be used as desired. Moreover, more than one pattern of recesses could be cut into the jig. In this instance, the various patterns will be coded by coloring the recesses to indicate the particular pattern being followed.

The present invention may be embodied in other specific forms without departing from the spirit or essential attributes thereof and, accordingly, reference should be made to the appended claims, rather than to the foregoing specification as indicating the scope of the invention.

I claim:
1. A method of manufacturing hollow core structures comprising the steps of providing a jig having recesses therein, inserting core pieces for said structure partly within said jig recesses, fixing a first lamina to said core pieces, then removing said first lamina and core pieces from said jig, and fixing a second lamina to said core pieces.

2. A method of manufacturing hollow core structures comprising the steps of forming a plurality of intersecting recesses in a jig, supporting core pieces within said recesses, fixing a first lamina to a portion of said core pieces that is outside said recesses, then removing said first lamina and said core pieces from said jig, and then fixing a second lamina to another portion of said core pieces opposite to said first lamina.

3. A method of manufacturing hollow core structures comprising the steps of forming a plurality of hollow recesses in a jig, supporting core pieces partly within said jig recesses, positioning individual core pieces only in abutting engagement with other core pieces, fixing a first lamina to portions of said core pieces that are outside said recesses, removing said lamina and core pieces from said jig, and fixing a second lamina to said core pieces.

4. A method of manufacturing sandwich panels comprising the steps of providing a jig having on its upper surface a plurality of recesses in an intersecting grid pattern, inserting core pieces within said jig recesses for forming a grid pattern of said core pieces, fixing a first panel sheet to portions of said core pieces that are outside said recesses, removing said first panel sheet and said core pieces from said jig, and fixing a second panel sheet to said core pieces opposed to said first panel sheet.

5. A method in accordance with claim 4 wherein said fixing steps include bonding said first and second sheets to said core pieces with a non-hardening glue which can be cured.

6. A method of manufacturing sandwich panels comprising the steps of providing a jig having therein a plurality of recesses arranged in a grid pattern, forming a grid pattern of core pieces by supporting them only within said jig recesses, fixing a first panel sheet to portions of said core pieces exposed outside said recesses, removing said first panel sheet and said core pieces from said jig recesses, and fixing a second panel sheet to other portions of said core pieces so that said first and second panel sheets are in facing substantially parallel relation.

7. A method of manufacturing sandwich panels in accordance with claim 6 including the steps of mitering and positioning selected core pieces in said recesses to define the outer periphery of said sandwich panel.

References Cited

UNITED STATES PATENTS

| 2,264,628 | 12/1941 | Engert et al. | |
| 2,852,932 | 9/1958 | Cable | 50—338 |
| 3,192,567 | 7/1965 | Abernathy et al. | 18—36 |

FOREIGN PATENTS 566,683  1/1945  Great Britain.

JACOB H. STEINBERG, *Primary Examiner.*